(12) United States Patent
Togashi et al.

(10) Patent No.: US 8,848,155 B2
(45) Date of Patent: Sep. 30, 2014

(54) LIQUID CRYSTAL PANEL WITH GAS BARRIER LAYER STRUCTURE AND LIQUID CRYSTAL PANEL PRODUCTION METHOD

(75) Inventors: Seigo Togashi, Sakado (JP); Makoto Arai, Tokorozawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 319 days.

(21) Appl. No.: 12/675,502

(22) PCT Filed: Aug. 29, 2008

(86) PCT No.: PCT/JP2008/066013
§ 371 (c)(1),
(2), (4) Date: Feb. 26, 2010

(87) PCT Pub. No.: WO2009/028730
PCT Pub. Date: Mar. 5, 2009

(65) Prior Publication Data
US 2010/0214521 A1 Aug. 26, 2010

(30) Foreign Application Priority Data

Aug. 31, 2007 (JP) ................................ 2007-226406
Aug. 31, 2007 (JP) ................................ 2007-226423
Mar. 31, 2008 (JP) ................................ 2008-093184

(51) Int. Cl.
*G02F 1/1339* (2006.01)
*G02F 1/1333* (2006.01)

(52) U.S. Cl.
CPC ........ *G02F 1/1339* (2013.01); *G02F 1/133345* (2013.01); *G02F 2001/133311* (2013.01); *G02F 2201/501* (2013.01)

USPC ............................................ 349/155; 349/190

(58) Field of Classification Search
USPC ........................................ 349/153, 154, 190
See application file for complete search history.

(56) References Cited

U.S. PATENT DOCUMENTS 4,325,610 A * 4/1982 Inoue ............................ 349/190
5,610,742 A * 3/1997 Hinata et al. .................. 349/122

(Continued)

FOREIGN PATENT DOCUMENTS

JP 4-016419 U 2/1992
JP 6-75209 A 3/1994

(Continued)

OTHER PUBLICATIONS

Chinese Office Action of Corresponding CN Application 200880104555.3 dated Apr. 21, 2011, China. pp. 1-8.

(Continued)

*Primary Examiner* — Hoan C Nguyen

(57) ABSTRACT

An object of the present invention is to provide a liquid crystal panel wherein provisions are made to effectively prevent the infiltration of gas from an end portion of a liquid crystal cell or from areas near cut portions of the liquid crystal cell, and a method for fabricating such a liquid crystal panel. More particularly, the present invention provides a liquid crystal panel includes a liquid crystal cell which includes a first substrate, a second substrate, a sealing member, and a liquid crystal layer provided between the first and second transparent substrates and sealed by the sealing member, a planarizing layer formed so as to cover an end portion of the liquid crystal cell, and a gas barrier layer formed on the planarizing layer. The invention also provides a method for producing such a liquid crystal panel.

5 Claims, 18 Drawing Sheets

(56) References Cited

U.S. PATENT DOCUMENTS

| | | | |
|---|---|---|---|
| 6,605,826 B2* | 8/2003 | Yamazaki et al. | 257/72 |
| 7,485,352 B2* | 2/2009 | Yuasa et al. | 428/34.1 |
| 2002/0024096 A1* | 2/2002 | Yamazaki et al. | 257/359 |
| 2003/0137715 A1* | 7/2003 | Poll et al. | 359/275 |
| 2006/0159436 A1* | 7/2006 | Yuasa et al. | 392/459 |

FOREIGN PATENT DOCUMENTS

| | | | | |
|---|---|---|---|---|
| JP | 09101528 A | * | 4/1997 | G02F 1/1339 |
| JP | 9-167763 A | | 6/1997 | |
| JP | 2000-305065 A | | 11/2000 | |
| JP | 2001-209062 A | | 8/2001 | |
| JP | 2001-221998 A | | 8/2001 | |
| JP | 2002-151253 A | | 5/2002 | |
| JP | 2004-103292 A | | 4/2004 | |
| JP | 2005-108468 A | | 4/2005 | |
| WO | WO 2007/034775 A1 | | 3/2007 | |

OTHER PUBLICATIONS

International Search Report, WO 2009/028730 A1, Sep. 30, 2008.

* cited by examiner

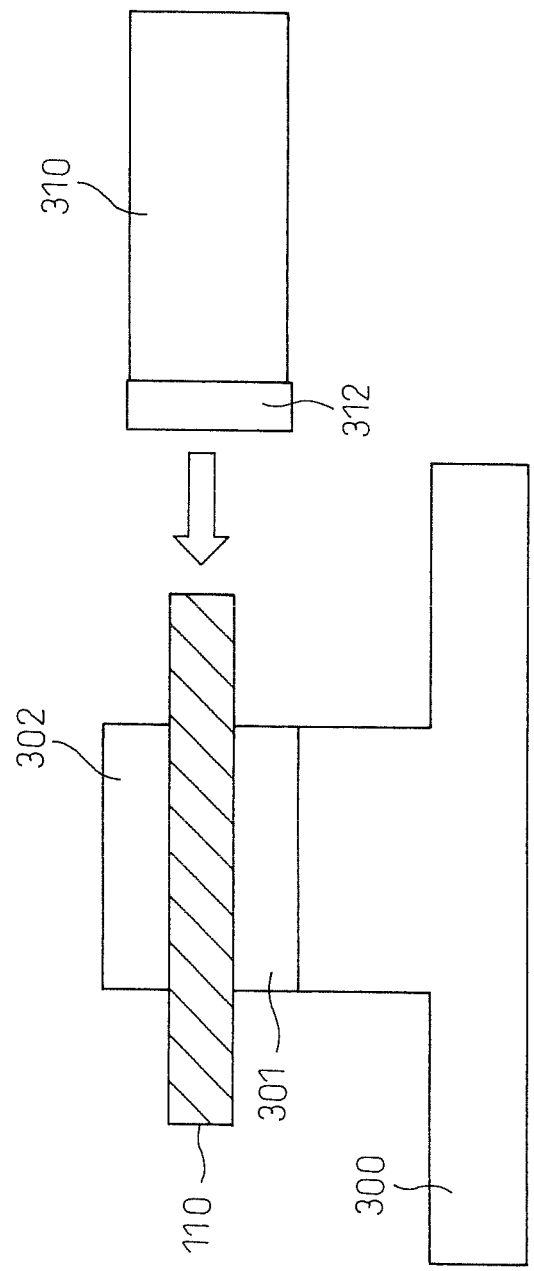

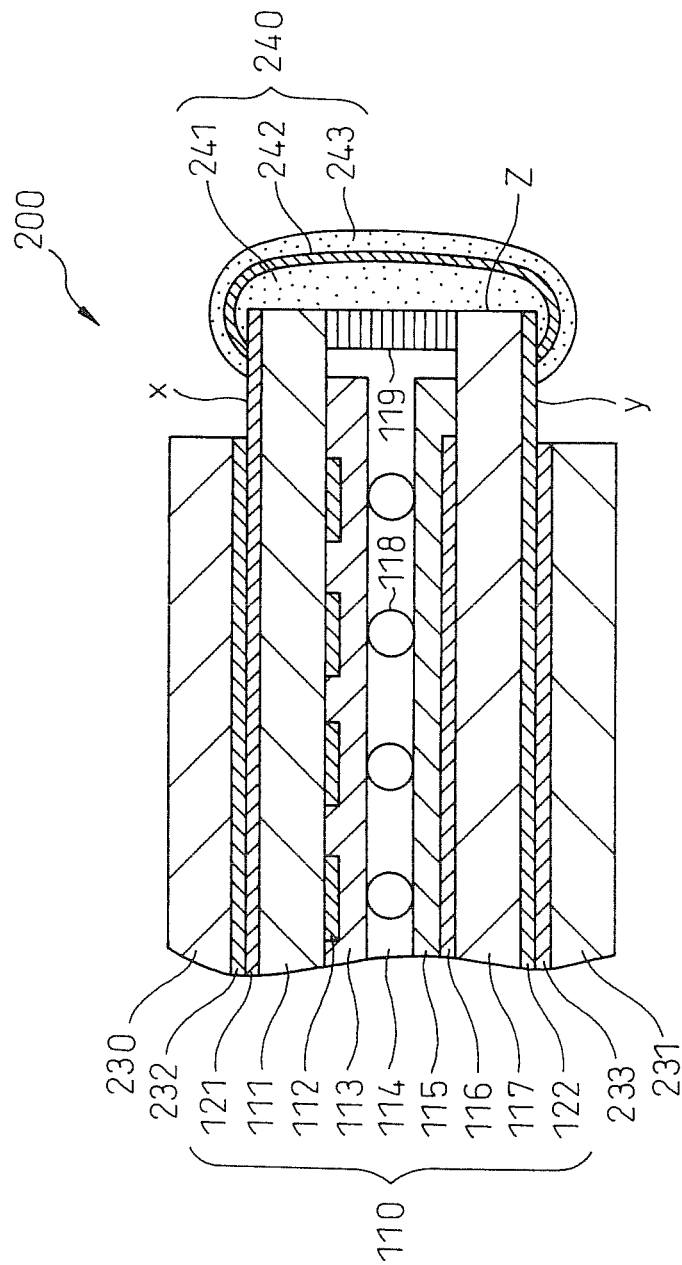

LIQUID CRYSTAL PANEL WITH GAS BARRIER LAYER STRUCTURE AND LIQUID CRYSTAL PANEL PRODUCTION METHOD

FIELD OF THE INVENTION

The present invention relates to a liquid crystal panel and a liquid crystal panel production method, and more particularly to a liquid crystal panel having a gas barrier layer on an end portion thereof and a method for producing such a liquid crystal panel.

BACKGROUND OF THE INVENTION

In a liquid crystal cell produced by sealing a liquid crystal between film substrates, there can occur cases where gas infiltrates into the sealed liquid crystal, forming gas bubbles therein.

To address this, it is known to apply an epoxy adhesive as a gas barrier layer around an end portion of the liquid crystal cell, thereby preventing gas from infiltrating into the liquid crystal cell from the end portion thereof (for example, patent document 1). However, with an organic material such as an epoxy adhesive, it is not possible to completely prevent the infiltration of gas, and there can still occur cases where gas bubbles are formed in the liquid crystal cell due to the infiltration of gas.

On the other hand, in a device constructed by sandwiching between two substrates a thin film formed from a light-emitting material that exhibits electroluminescence (EL), it is known to form a DLC (diamond-like carbon) film as a gas barrier layer around an end face of the device in order to prevent the infiltration of vapor (for example, patent document 2).

Further, as one example of a conventional method for forming a thin film on a substrate, it is known to provide a method that performs film deposition, for example, by stacking a plurality of substrates vertically one above another on a substrate holder (for example, patent document 3).

Patent document 1: Japanese Unexamined Patent Publication No. 2001-221998 (FIG. 2)
Patent document 2: Japanese Unexamined Patent Publication No. 2002-151253 (FIG. 1)
Patent document 2: Japanese Unexamined Patent Publication No. H09-167763

SUMMARY OF THE INVENTION

FIG. 15 is a diagram explaining a part of a liquid crystal cell production process.

As shown in FIG. 15(a), a plurality of liquid crystal cells 110, each includes a first transparent substrate 111, a first transparent electrode pattern 112, a first alignment layer 113, a liquid crystal layer 114, a second alignment layer 115, a second transparent electrode pattern 116, a second transparent substrate 117, a plurality of spacers 118, and a sealing member 119, are simultaneously formed, and a second gas barrier layer 121 and third gas barrier layer 122 for preventing the infiltration of gas are formed by plasma coating on the outside surfaces of the first transparent substrate 111 and second transparent substrate 117, respectively.

Subsequently, the completed structure is cut by a cutter (not shown) at the portions indicated by arrows "a" and "b" in FIG. 15(a) to separate each individual liquid crystal cell 110.

FIG. 15(b) is an enlarged view showing a portion of the end face of the liquid crystal cell 110 cut by the cutter; as illustrated, numerous fine grooves "g" with a depth of about 1 µm are formed in the cut face. These grooves "g" are formed presumably because, when viewed microscopically, the substrates having some degree of elasticity are cut in such a manner as to be torn off by the rounded edge of the cutter.

As a result, if an inorganic gas barrier layer is applied as a coating directly on the end face of the liquid crystal cell 110, the coating cannot be formed so as to fill the grooves "g", and it is therefore not possible to completely prevent the infiltration of gas through the portions of the grooves "g".

In view of this deficiency, it is an object of the present invention to provide a liquid crystal panel wherein provisions are made to effectively prevent the infiltration of gas from the end portion of the liquid crystal cell, and a method for producing such a liquid crystal panel.

Further, since cracks occur in the second and third gas barrier layers 121 and 122 near the cut portions (indicated by dashed circles "c" to "f" in FIG. 1) of the first and second substrates 111 and 117, if the gas barrier layer is applied only on the end portion of the liquid crystal cell 110, there is the possibility that gas may infiltrate through the cracks. Further, polarizers are placed on the second and third gas barrier layers 121 and 122 by interposing adhesive layers therebetween and there also is the possibility that the gas generated in the adhesive layers may infiltrate into the liquid crystal cell through the cracks formed in the second and third gas barrier layers 121 and 122.

Accordingly, it is an object of the present invention to provide a liquid crystal panel wherein provisions are made to effectively prevent the infiltration of gas from the areas near the cut portions as well as from the end portion of the liquid crystal cell, and a method for producing such a liquid crystal panel.

FIG. 16 is a diagram showing an example of film deposition.

FIG. 16(a) is a cross-sectional view showing the condition in which wafers (substrates) 159 are mounted on a substrate supporting jig 150 installed inside a reaction tube 152. FIG. 16(b) is a diagram showing the setup of FIG. 16(a) as viewed from the top. As shown in FIG. 16, each substrate 159 is supported on a frame 151 of the substrate supporting jig 150. The method shown in FIG. 16 is intended to deposit a film on the upper surface of the substrate 159, but is not intended to deposit a film around the periphery of the substrate. As a result, no film is deposited on the peripheral portions of the substrate 159 that are located close to the substrate supporting jig 150, and the method cannot be used for the purpose of depositing film around the periphery of the substrate. Furthermore, if dirt has collected on the frame 151 where the substrate 159 contacts, scratches may occur on the reverse side of the substrate 159. A substrate supporting jig such as shown in FIG. 16 can be used in applications where scratches on the reverse side of the substrate do not present a serious problem, as in the case of a silicon wafer; however, in applications where scratches on the reverse side affect the external appearance, as in the case of a liquid crystal panel, the substrate supporting jig such as shown in FIG. 16 cannot be used because such scratches can degrade the quality.

Accordingly, it is also an object of the present invention to provide a liquid crystal panel production method that can deposit film around the end portion of the liquid crystal panel while preventing the occurrence of scratches on the substrates of the liquid crystal panel.

A liquid crystal panel according to the present invention includes a liquid crystal cell which includes a first substrate, a second substrate, a sealing member, and a liquid crystal layer provided between the first and second transparent substrates and sealed by the sealing member, a planarizing layer formed so as to cover an end portion of the liquid crystal cell, and a gas barrier layer formed on the planarizing layer.

A liquid crystal panel production method according to the present invention includes the steps of forming a liquid crystal cell which includes a first substrate, a second substrate, a sealing member, and a liquid crystal layer provided between the first and second transparent substrates and sealed by the sealing member, applying a planarizing layer so as to cover an end portion of the liquid crystal cell, and forming a gas barrier layer on the planarizing layer.

According to the liquid crystal panel of the invention thus produced in accordance with the method of the invention, it is possible to prevent the infiltration of gas from the end portion of the liquid crystal panel, thereby preventing the generation of gas bubbles in the liquid crystal layer.

A liquid crystal panel according to the present invention includes a liquid crystal cell which includes a first substrate, a second substrate, a sealing member, and a liquid crystal layer provided between the first and second transparent substrates and sealed by the sealing member, the liquid crystal cell further including an end portion, an upper surface, and a lower surface, a planarizing layer formed so as to cover designated portions of the upper and lower surfaces, as well as the end portion of the liquid crystal cell, and a gas barrier layer formed on the planarizing layer.

A liquid crystal panel production method according to the present invention includes steps of forming a plurality of liquid crystal cells, each including a first substrate, a second substrate, a sealing member, and a liquid crystal layer provided between the first and second transparent substrates and sealed by the sealing member, each liquid crystal cell further including an end portion, an upper surface, and a lower surface, separating each individual liquid crystal cell by cutting along the end portion of the liquid crystal cell; applying a planarizing layer so as to cover designated portions of the upper and lower surfaces, as well as the end portion of the liquid crystal cell, and forming a gas barrier layer on the planarizing layer.

According to the liquid crystal panel of the invention thus produced in accordance with the method of the invention, it is possible to prevent the infiltration of gas from the areas near the cut portions along which each liquid crystal cell is separated, as well as from the end portion of the liquid crystal panel, thereby preventing the generation of gas bubbles in the liquid crystal layer.

The method for producing a liquid crystal panel according to the present invention includes steps of setting up a panel holder having a panel supporting member for supporting the liquid crystal panel, mounting the liquid crystal panel onto the panel holder so that the panel supporting member supports the liquid crystal panel by contacting part of an end portion of the liquid crystal panel, and depositing a film material onto the end portion of the liquid crystal panel to form a film thereon.

Preferably, in the liquid crystal panel production method according to the present invention, the liquid crystal panel is supported at a plurality of places along the end portion of the liquid crystal panel by a plurality of panel supporting members.

Preferably, in the liquid crystal panel production method according to the present invention, the end portion of the liquid crystal panel contacts the panel supporting member along a line or at a single point.

Preferably, in the liquid crystal panel production method according to the present invention, the film material is deposited by sputtering onto the end portion of the liquid crystal panel. In this case, it is preferable to place the liquid crystal panel with the end portion thereof facing toward the film material to be sputtered, and to conduct the sputtering while rotating the liquid crystal panel along an outer circumferential direction.

According to the liquid crystal panel production method of the invention, film can be deposited on the upper and lower surfaces of the liquid crystal panel as well as on the end portion of the liquid crystal panel without causing scratches on the upper and lower surfaces of the liquid crystal panel.

BRIEF DESCRIPTION OF THE DRAWINGS

FIG. 3 is a diagram showing a jig used when forming the planarizing layer.

FIG. 5 is a schematic cross-sectional view of another liquid crystal penal according to the present invention.

DETAILED DESCRIPTION OF THE PREFERRED EMBODIMENT

A liquid crystal panel and a production method thereof according to the present invention will be described below with reference to the drawings.

Figure 1:
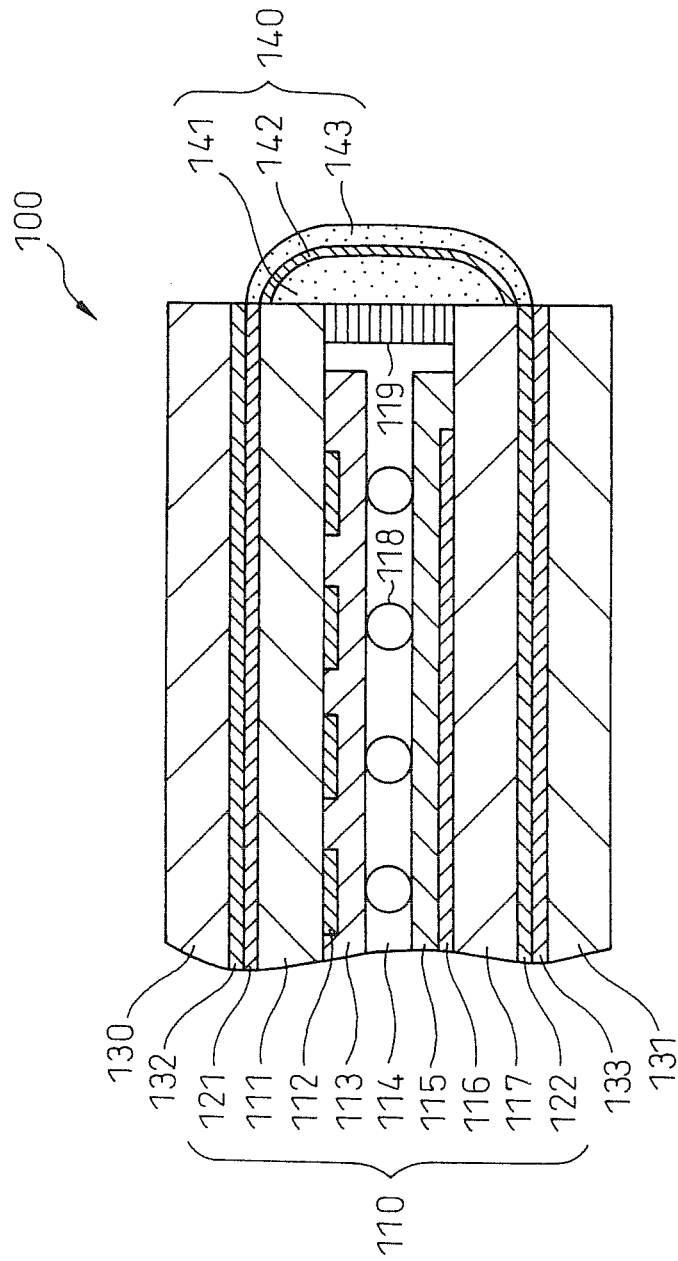
FIG. 1 is a schematic cross-sectional view of a liquid crystal penal according to the present invention.

FIG. 1 is a schematic cross-sectional view of a liquid crystal penal according to the present invention.

The liquid crystal penal 100 shown in FIG. 1 includes a liquid crystal cell 110, a first polarizer 130 disposed on the upper surface of the liquid crystal cell 110, a first adhesive layer 132 for fixing the first polarizer 130, a second polarizer 131 disposed on the lower surface of the liquid crystal cell 110, a second adhesive layer 133 for fixing the second polarizer 131, and a first gas barrier layer 140 formed so as to cover an end portion (which forms a cut face) of the liquid crystal cell 110.

The liquid crystal cell 110 includes a first transparent substrate 111, a second transparent substrate 117, a sealing member 119, a plurality of spacers 118 arranged so as to maintain a constant gap between the first and second transparent substrates 111 and 117, a liquid crystal layer 114 provided between the first and second transparent substrates 111 and 117 and sealed by the sealing member 119, a second gas barrier layer 121 formed so as to cover the first transparent substrate 111, and a third gas barrier layer 122 formed so as to cover the second transparent substrate 117. Further, a first transparent electrode pattern 112 and a first alignment film 113 are formed on the first transparent substrate 111, and a second transparent electrode pattern 116 opposing the first transparent electrode pattern 112 and a second alignment film 115 are formed on the second transparent substrate 117. It is to be noted that, for illustrative purposes, the scale in FIG. 1 may not reflect the actual scale.

The liquid crystal layer 114 is formed from a commonly used liquid crystal material such as a TN (Twisted Nematic) liquid crystal.

The first and second transparent substrates 111 and 117 are each formed from a flexible polycarbonate resin with a thickness of 100 μm. However, the first and second transparent substrates 111 and 117 are not limited to this specific material, but use may be made of a modified acrylic resin, a polymethyl methacrylate resin, a polyether sulfone resin, a polyethylene terephthalate resin, a norbornene resin, glass, or the like, and the thickness can be chosen within the range of 50 μm to 250 μm.

The first and second transparent electrode patterns 112 and 115 are each formed by sputtering a transparent conductive film of ITO to a thickness of about 0.03 μm over the first or second transparent substrate 111 or 117, respectively, and then patterning the film by etching away unwanted portions. Wiring lines are provided to the first and second transparent electrode patterns so that a prescribed AC voltage can be applied from a display drive controller (not shown) of the liquid crystal panel 100. The display drive controller of the liquid crystal panel 100 is constructed to be able to switch the liquid crystal layer 114 between transmissive mode and non-transmissive mode by applying the prescribed AC voltage between the first and second transparent electrode patterns 112 and 115.

The second and third gas barrier layers 121 and 122 are formed by sputtering silicon dioxide on the first and second transparent substrates 111 and 117 during the fabrication of the liquid crystal cell.

The first gas barrier layer 140 includes a planarizing layer 141, an inorganic gas barrier layer 142, and an organic gas barrier layer 143. The cross-sectional view of FIG. 2 shows only a portion of the liquid crystal panel 100, but it is to be understood that the gas barrier layer 140 is formed around substantially the entire periphery of the liquid crystal cell 110.

The planarizing layer 141 is formed by depositing "MAXIVE" (registered trademark), a gas barrier resin composed principally of epoxy, to a thickness corresponding to a dry thickness of about 5 to 10 μm. As previously described, fine grooves are formed in the end face of the liquid crystal cell 110 when cut (see FIG. 15(b)), and if the inorganic gas barrier layer is formed by sputtering, etc., directly on the end face, the infiltration of gas cannot be prevented because the grooves cannot be covered in a reliable manner by the inorganic gas barrier layer. In view of this, to fill the grooves, the planarizing layer 141 as an underlying layer is formed in such a manner so as to cover the end face of the liquid crystal cell 110. In the present embodiment, since the planarizing layer 141 is formed from a resin composed principally of epoxy having gas barrier capability, the gas barrier performance can be further enhanced.

Then, the inorganic gas barrier layer 142 is formed by sputtering silicon dioxide to a thickness of 100 nm. The material for the inorganic gas barrier layer is not limited to silicon dioxide, but use may be made, for example, of silicon nitride, DLC, aluminum foil, copper foil, etc. It will also be noted that the desired gas barrier capability can be obtained as long as the thickness is 10 nm or greater. Since the inorganic gas barrier layer 142 is deposited on the surface planarized by the planarizing layer 141, the end portion of the liquid crystal cell 110 can be covered in a reliable manner.

The organic protective layer 143 is formed by depositing "MAXIVE" (registered trademark), a gas barrier resin composed principally of epoxy, to a thickness corresponding to a dry thickness of about 5 to 10 μm. Since sufficient gas barrier performance can be achieved with the planarizing layer 141 and inorganic gas barrier layer 142 having gas barrier capability, the organic protective layer 143 need not necessarily be provided. However, since the inorganic gas barrier layer 142 is hard, there can occur scratches, cracks, etc., as well as pinholes during the deposition, and the organic protective layer 143 is provided to make up for the gas barrier deficiencies that can occur due to such pinholes, scratches, cracks, etc. Accordingly, the provision of the organic protective layer 143 serves to reliably confer the gas barrier capability to the end portion of the liquid crystal cell 110.

FIG. 2 is a diagram for explaining the fabrication process of the liquid crystal panel 100.

Figure 2A:
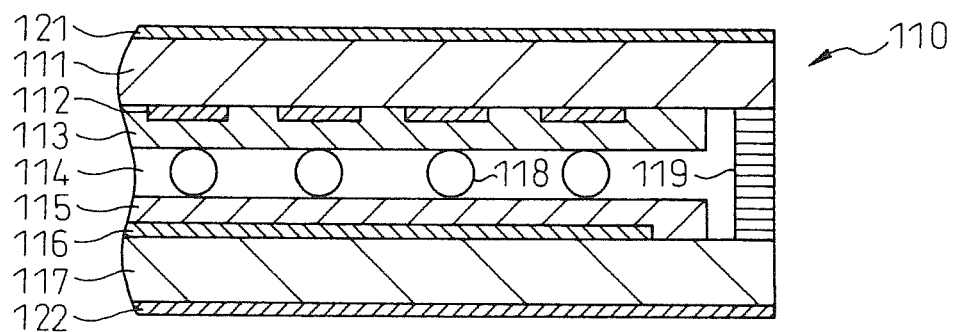
FIG. 2(a) is a diagram showing the condition in which one liquid crystal cell 110 is separated.
Figure 15A:
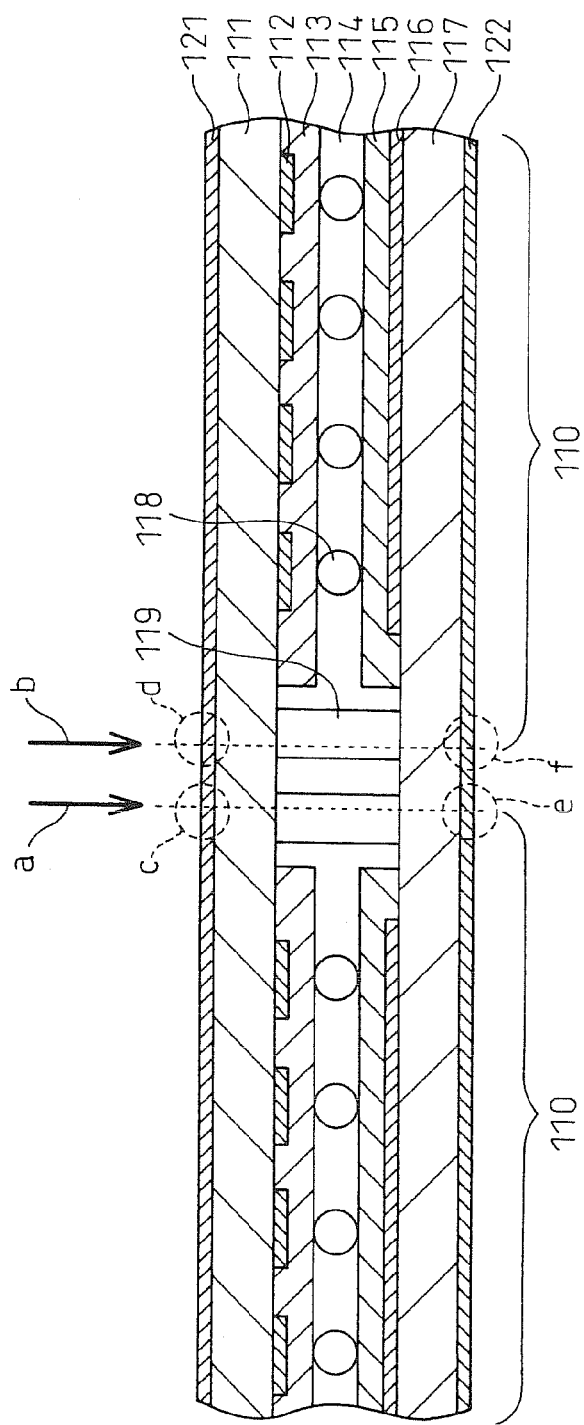
FIG. 15(a) is a diagram explaining a part of a liquid crystal cell fabrication process.
Figure 15B:
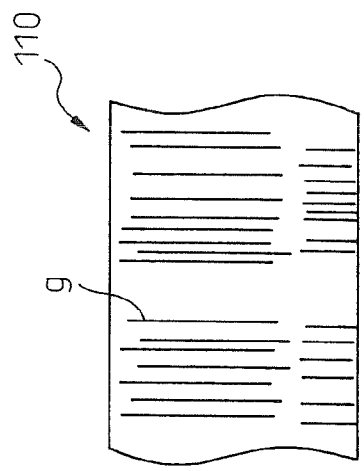
FIG. 15(b) is an enlarged view showing a portion of an end face of the liquid crystal cell 110 cut by a cutter.
Figure 16A:
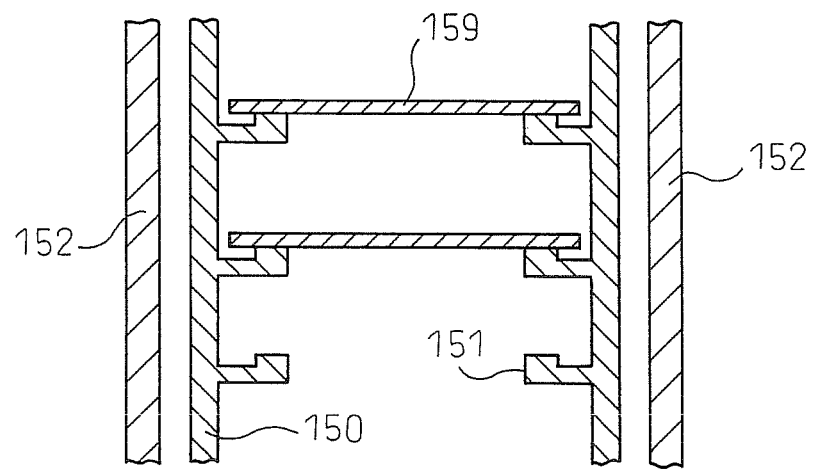
FIG. 16(a) is a cross-sectional view showing the condition in which wafers (substrates) 159 are mounted on a substrate supporting jig 150 installed inside a reaction tube 152.
Figure 16B:
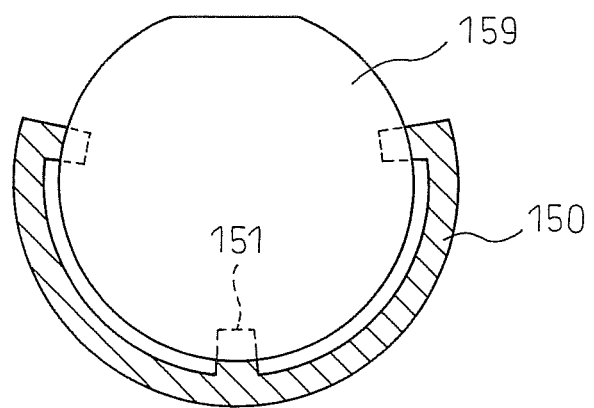
FIG. 16(b) is a diagram showing the setup of FIG. 16(a) as viewed from the top.

FIG. 2(a) shows the condition in which one liquid crystal cell 110 is separated by cutting a plurality of simultaneously formed liquid crystal cells 110 by a cutter (i.e., the condition after the step of FIG. 15(a)).

In the condition shown in FIG. 2(a), the liquid crystal cell 110 includes the first transparent substrate 111, first transparent electrode pattern 112, first alignment film 113, liquid crystal layer 114, second alignment film 115, second transparent electrode pattern 116, second transparent substrate 117, spacers 118, sealing member 119, second gas barrier layer 121, and third gas barrier layer 122. Further, as previously described, fined grooves are formed in the end face of the liquid crystal cell 110 when cut (see FIG. 15(b)).

Figure 2B:
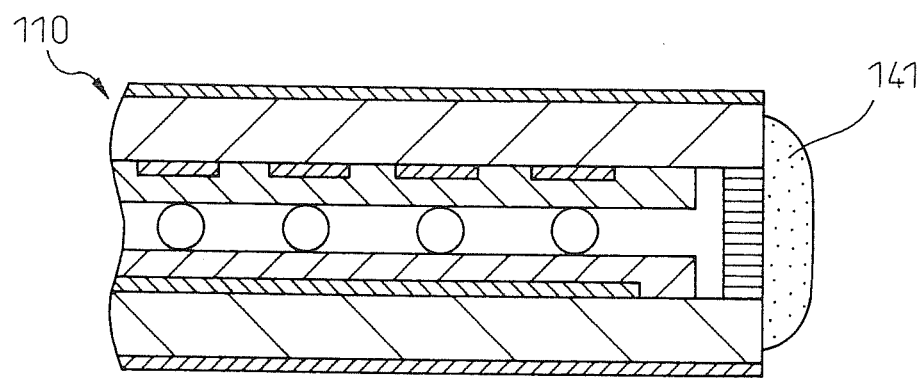
FIG. 2(b) is a diagram showing the condition in which a planarizing layer 141 is formed in such a manner so as to cover the end portion of the liquid crystal cell 110.

FIG. 2(b) shows the condition in which the planarizing layer 141 is formed in such a manner as to cover the end portion of the liquid crystal cell 110.

A jig such as shown in FIG. 3 is used when forming the planarizing layer 141. That is, the liquid crystal cell 110 shown in FIG. 2(a) is clamped between a metal plate 301 and a magnet 302 arranged on a base 300, and is held fixed so that the end portion around the periphery of the liquid crystal cell 110 can be easily coated. Since the liquid crystal cell 110 is held fixed by the magnetic force working between the magnet 302 and the metal plate 301, the planarizing layer 141 can be easily applied without scratching the liquid crystal cell 110 and without using a special adhesive, etc.

After fixing the liquid crystal cell 110 in position, a solution 312, prepared by dissolving "MAXIVE" (registered trademark), a gas barrier resin composed principally of epoxy, into a solvent, is applied to an end of a melamine resin sponge 310 which is then brought into contact with the designated portion of the liquid crystal cell 110 to apply a coating thereon. Instead of the melamine resin sponge 310, a high-density sponge or a cloth of finely woven fiber or the like may be used to apply the planarizing layer 141. After forming the coating of the solution 312, the liquid crystal cell 110 is heated at 60° to 80° for about one hour to evaporate the solvent, completing the formation of the planarizing layer 141. The planarizing layer 141 may be formed by applying the solution a plurality of times.

Figure 2C:
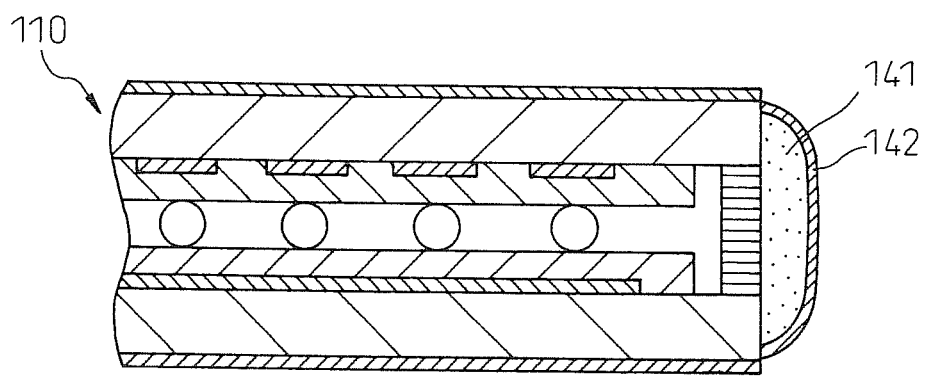
FIG. 2(c) is a diagram showing the condition in which an inorganic gas barrier layer 142 is deposited on the planarizing layer 141.

FIG. 2(c) is a diagram showing the condition in which the inorganic gas barrier layer 142 is deposited on the planarizing layer 141.

Figure 4A:
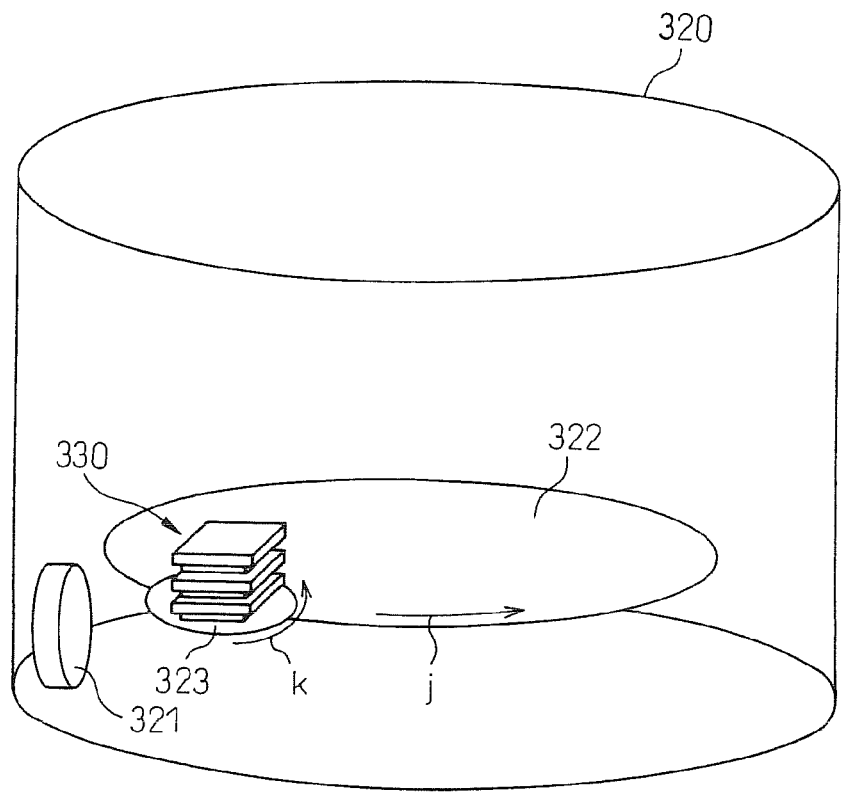
FIG. 4(a) is a diagram explaining a method for depositing the inorganic gas barrier layer.
Figure 4B:
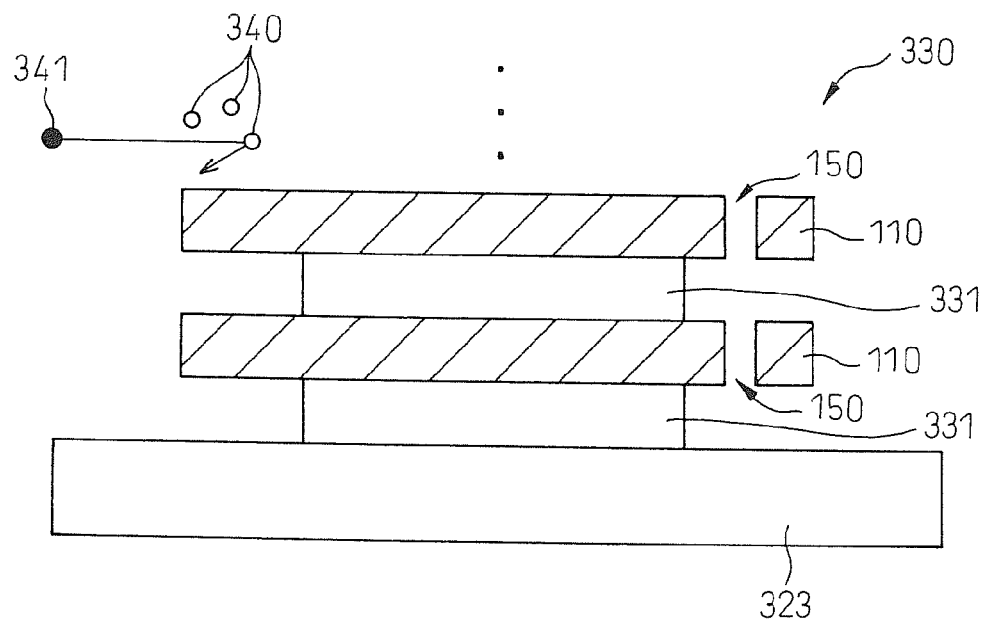
FIG. 4(b) is a diagram for explaining a stack 330 comprising a large number of liquid crystal cells 110 stacked one on top of another.

The inorganic gas barrier layer 142 is deposited under an argon-oxygen atmosphere by causing silicon dislodged from a target 321 to react with the oxygen while rotating the liquid crystal cell 110. As shown in FIG. 4(a), a stack 330 comprising a large number of liquid crystal cells 110 stacked one on top of another is placed on a small turntable 323 rotating in a k direction on its axis, the small turntable 323 being mounted on a large turntable 322 revolving in a j direction. As shown in FIG. 4(b), the stack 330 contains about 30 liquid crystal cells 100 stacked one on top of another by alternately sandwiching therebetween spacers whose size is a little smaller than the liquid crystal cells 110, and the liquid crystal cells 110 are arranged with their end portions exposed. Since silicon dioxide molecules 341 randomly move by colliding with argon molecules 340, the inorganic gas barrier layer 142 can be deposited to a prescribed thickness (for example, 100 nm) evenly on the end portion of each liquid crystal cell 110. Since each liquid crystal cell 110 is mounted with its end portion exposed, if the liquid crystal cell 110 has an opening 150 as shown in FIG. 4(b), for example, the inorganic gas barrier layer can be deposited in a good condition even on the portion of the opening 150.

Figure 2D:
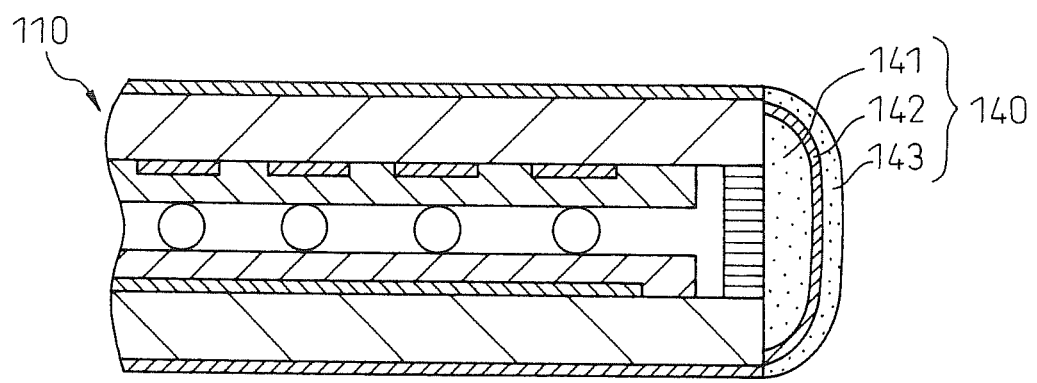
FIG. 2(d) is a diagram showing the condition in which an organic protective layer 143 is formed over the inorganic gas barrier layer 142.

FIG. 2(d) is a diagram showing the condition in which the organic protective layer 143 is formed over the inorganic gas barrier layer 142.

When forming the organic protective layer 143, a jig such as shown in FIG. 3 is used in a manner similar to the formation of the planarizing layer 141; that is, a solution 312, prepared by dissolving "MAXIVE" (registered trademark), a gas barrier resin composed principally of epoxy, into a solvent, is applied to an end of a melamine resin sponge 310 which is then brought into contact with the designated portion of the liquid crystal cell 110 to apply a coating thereon. After forming the coating of the solution 312, the liquid crystal cell 110 is heated at 60° to 80° for about one hour to evaporate the solvent, completing the formation of the organic protective layer 143.

By performing the fabrication steps illustrated in FIGS. 2(a) to 2(d), as described above, the first gas barrier layer 140 is formed on the end portion of the liquid crystal cell 110.

After forming the first gas barrier layer 140, the first adhesive layer 132 and the first polarizer are disposed on the upper surface of the liquid crystal cell 110, and the second adhesive layer 133 and the second polarizer are disposed in like manner on the lower surface of the liquid crystal cell 110, thereby completing the fabrication of the liquid crystal panel 100.

When using an aluminum foil as the inorganic gas barrier layer 142, the aluminum foil is bonded to the planarizing layer 141 so as to cover the coating surface thereof, and then subjected to pressure in an autoclave to purge gas bubbles; after that, an adhesive is applied around the edge of the aluminum foil to complete the placement of the aluminum foil. As the adhesive for the aluminum foil, it is preferable to use the same resin as that used to form the planarizing layer 141.

FIG. 5 is a schematic cross-sectional view of another liquid crystal penal according to the present invention.

The liquid crystal penal 200 shown in FIG. 5 comprises a liquid crystal cell 110, a first polarizer 230 disposed on the upper surface "x" of the liquid crystal cell 110, a first adhesive layer 232 for fixing the first polarizer 230, a second polarizer 231 disposed on the lower surface "y" of the liquid crystal cell 110, a second adhesive layer 233 for fixing the second polarizer 231, and a first gas barrier layer 240 formed so as to cover an end portion "z" (cut face), a portion of the upper surface "x" (near the cut face), and a portion of the lower surface "y" (near the cut face) of the liquid crystal cell 110. The liquid crystal cell 110 is the same as that used in the liquid crystal panel 100 shown in FIG. 1, and will not be further described herein.

The first gas barrier layer 240 includes a planarizing layer 241, an inorganic gas barrier layer 242, and an organic gas barrier layer 243. The cross-sectional view of FIG. 5 shows only a portion of the liquid crystal panel 200, but it is to be understood that the gas barrier layer 240 is formed around substantially the entire periphery of the liquid crystal cell 110.

The planarizing layer 241 is formed by depositing "MAXIVE" (registered trademark), a gas barrier resin composed principally of epoxy, to a thickness corresponding to a dry thickness of about 5 to 10 μm. As previously described, the upper and lower surfaces "x" and "y" of the liquid crystal cell 110 contain cracks in the portions thereof near the cut face, and if the cracks are left uncovered, gas may infiltrate through the cracks. Further, if the inorganic gas barrier is formed by sputtering, etc., so as to cover the cracks, the infiltration of gas cannot be prevented because the cracks cannot be covered in a reliable manner by the inorganic gas barrier layer. Likewise, fine grooves are formed in the end portion "z" of the liquid crystal cell 110 when cut (see FIG. 15(b)), and if the inorganic gas barrier layer is formed by sputtering, etc., directly on the end face, the infiltration of gas cannot be prevented because the grooves cannot be covered in a reliable manner by the inorganic gas barrier layer. In view of this, in order to fill the cracks and grooves, the planarizing layer 241 as an underlying layer is formed in such a manner as to cover not only the end portion "z" of the liquid crystal cell 110 but also the portions of the upper and lower surfaces "x" and "y" near the cut face. In the present embodiment, since the planarizing layer 241 is formed from a resin composed principally of epoxy having gas barrier capability, the gas barrier performance can be further enhanced.

Then, the inorganic gas barrier layer 242 is formed by sputtering silicon dioxide to a thickness of 100 nm. The material for the inorganic gas barrier layer is not limited to silicon dioxide, but use may be made, for example, of silicon nitride, DLC, aluminum foil, copper foil, etc. It will also be noted that the desired gas barrier capability can be obtained as long as the thickness is 10 nm or greater. Since the inorganic gas barrier layer 242 is deposited on the surface planarized by the planarizing layer 241, the end portion "z" of the liquid crystal cell 110 and the portions of the upper and lower surfaces "x" and "y" near the cut face can be covered in a reliable manner.

The organic protective layer 243 is formed by depositing "MAXIVE" (registered trademark), a gas barrier resin composed principally of epoxy, to a thickness corresponding to a dry thickness of about 5 to 10 μm. Since sufficient gas barrier performance can be achieved with the planarizing layer 241 and inorganic gas barrier layer 242 having gas barrier capability, the organic protective layer 243 need not necessarily be provided. However, since the inorganic gas barrier layer 242 is hard, there can occur scratches, cracks, etc., as well as pinholes during the deposition, and the organic protective layer 243 is provided to make up for the gas barrier deficiencies that can occur due to such pinholes, scratches, cracks, etc. Accordingly, the provision of the organic protective layer 243 serves to reliably confer the gas barrier capability to the end portion "z" of the liquid crystal cell 110 and the portions of the upper and lower surfaces "x" and "y" near the cut face.

FIG. 6 is a diagram explaining the production process of the liquid crystal panel 200.

Figure 6A:
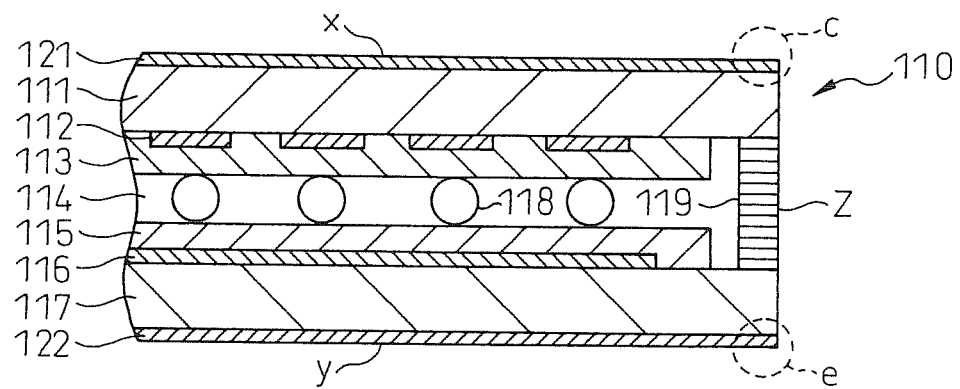
FIG. 6(a) is a diagram showing the condition in which one liquid crystal cell 110 is separated.

FIG. 6(a) shows the condition in which one liquid crystal cell 110 is separated by cutting a plurality of simultaneously formed liquid crystal cells 110 by a cutter (i.e., the condition after the step of FIG. 15). In the condition shown in FIG. 6(a), the liquid crystal cell 110 is identical in structure to that shown in FIG. 2(a).

Figure 6B:
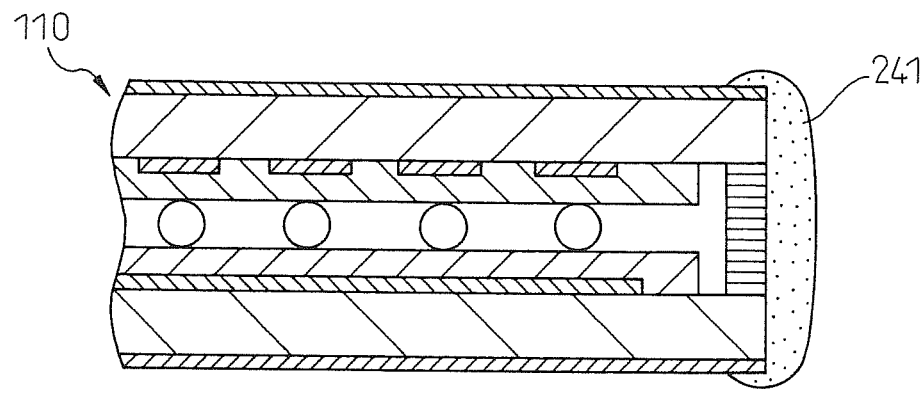
FIG. 6(b) is a diagram showing the condition in which a planarizing layer 241 is formed in such a manner as to cover the end portion of the liquid crystal cell 110.

FIG. 6(b) shows the condition in which the planarizing layer 241 is formed in such a manner as to cover the end portion "z" of the liquid crystal cell 110 and the portions "c" and "e" of the upper and lower surfaces "x" and "y" near the cut face.

A jig such as shown in FIG. 3 is used when forming the planarizing layer 241. The detailed procedure for forming the planarizing layer 241 is the same as that described using FIG. 3 in conjunction with FIG. 2(b), and therefore, the description will not be repeated here.

Figure 6C:
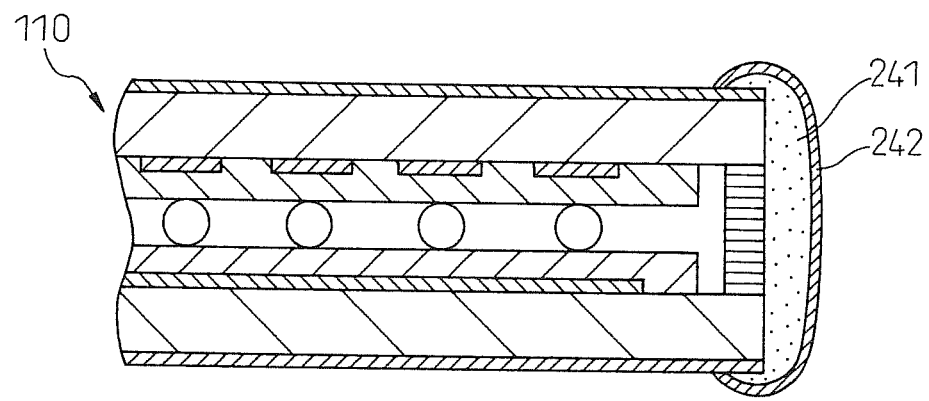
FIG. 6(c) is a diagram showing the condition in which an inorganic gas barrier layer 242 is deposited on the planarizing layer 241.

FIG. 6(c) is a diagram showing the condition in which the inorganic gas barrier layer 242 is deposited on the planarizing layer 241.

The inorganic gas barrier layer 242 is deposited under an argon-oxygen atmosphere by causing silicon dislodged from a target 321 to react with the oxygen while rotating the liquid crystal cell 110. The detailed procedure for depositing the inorganic gas barrier layer 242 is the same as that described using FIG. 4 in conjunction with FIG. 2(c), and therefore, the description will not be repeated here.

Figure 6D:
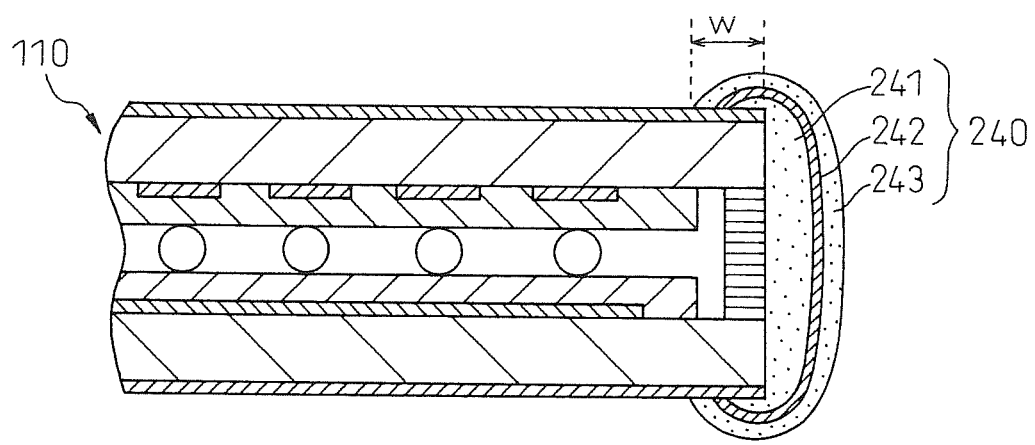
FIG. 6(d) is a diagram showing the condition in which an organic protective layer 243 is formed over the inorganic gas barrier layer 242.

FIG. 6(d) is a diagram showing the condition in which the organic protective layer 243 is formed over the inorganic gas barrier layer 242.

When forming the organic protective layer 243, a jig such as shown in FIG. 3 is used in a manner similar to the formation of the planarizing layer 241. The detailed procedure for forming the organic protective layer 243 is the same as that described using FIG. 3 in conjunction with FIG. 2(d), and therefore, the description will not be repeated here.

By performing the production steps illustrated in FIGS. 6(a) to 6(d), as described above, the first gas barrier layer 240 is formed on the end portion "z" of the liquid crystal cell 110 and its neighboring portions. It is desirable that the first gas barrier layer 240 be formed over the end portion of the liquid crystal cell 110 in such a manner as to extend over a distance "w" from the cut face of the liquid crystal cell 110, as shown in FIG. 6(d). In the present embodiment, the distance "w" is chosen to be 0.5 mm.

After forming the first gas barrier layer 240, the first adhesive layer 232 and the first polarizer 230 are disposed on the upper surface "x" of the liquid crystal cell 110 in such a manner as to avoid the first gas barrier layer 240, and the second adhesive layer 233 and the second polarizer 231 are disposed in like manner on the lower surface of the liquid crystal cell 110, thereby completing the fabrication of the liquid crystal panel 200. It is preferable to form the first and second adhesive layers 232 and 233 so as not to contact the gas barrier layer 240, because gas may be emitted from the first and second adhesive layers 232 and 233.

When using an aluminum foil as the inorganic gas barrier layer 242, the aluminum foil is bonded to the planarizing layer 241 so as to cover the coating surface thereof, and then subjected to pressure in an autoclave to purge gas bubbles; after that, an adhesive is applied around the edge of the aluminum foil to complete the placement of the aluminum foil. As the adhesive for the aluminum foil, it is preferable to use the same resin as that used to form the planarizing layer 241.

Evaluation results of the liquid crystal panels 100 and 200 produced in the above manner will be described below.

Liquid crystal panels were stored in an environment held at a temperature of 70° C. and a pressure of 2.2 atmospheres, and after a prescribed time elapsed, the liquid crystal panels were taken out and placed in a normal temperature, normal pressure environment; then, a pressure test was conducted using an iron ball by applying a pressure of 20 N/cm$^2$ for 10 seconds to each liquid crystal panel. At this time, the presence or absence of gas bubbles in the liquid crystal panel and the time required for the gas bubbles, if present, to disappear were observed. The results showed that, in the case of a liquid crystal panel provided with neither the gas barrier layer 140 nor the gas barrier layer 240 on its end portion, gas bubbles began to be observed in the liquid crystal panel when the pressure test was conducted after 300 to 400 hours had elapsed. On the other hand, in the case of the liquid crystal panel 100 provided with the gas barrier layer 140 only on its end face, gas bubbles began to be observed in the liquid crystal panel when the pressure test was conducted after about 700 hours had elapsed. In the case of the liquid crystal panel 200 provided with the gas barrier layer 240 so as to cover its end portion, gas bubbles began to be observed in the liquid crystal panel when the pressure test was conducted after about 1000 hours had elapsed.

When the acceleration factors for the above measurement results were estimated from the above results and the results of other reliability tests, and were applied to the respective cases, the conclusion was reached that the useful life of the liquid crystal panel provided with neither the gas barrier layer 140 nor the gas barrier layer 240 on its end portion is considered to be about two years because of the generation of gas bubbles. On the other hand, it has been found that, in the case of the liquid crystal panel 100 provided with the gas barrier layer 140 only on its end face, the useful life is four to five years and, in the case of the liquid crystal panel 200 provided with the gas barrier layer 240 so as to cover its end portion, the useful life can be greatly extended to five to six years.

As described above, in the liquid crystal panels 100 and 200, the inorganic gas barrier layers 142 and 242 have been deposited using the equipment shown in FIG. 4. However, it is also possible to deposit such films using the equipment hereinafter described.

Figure 7:
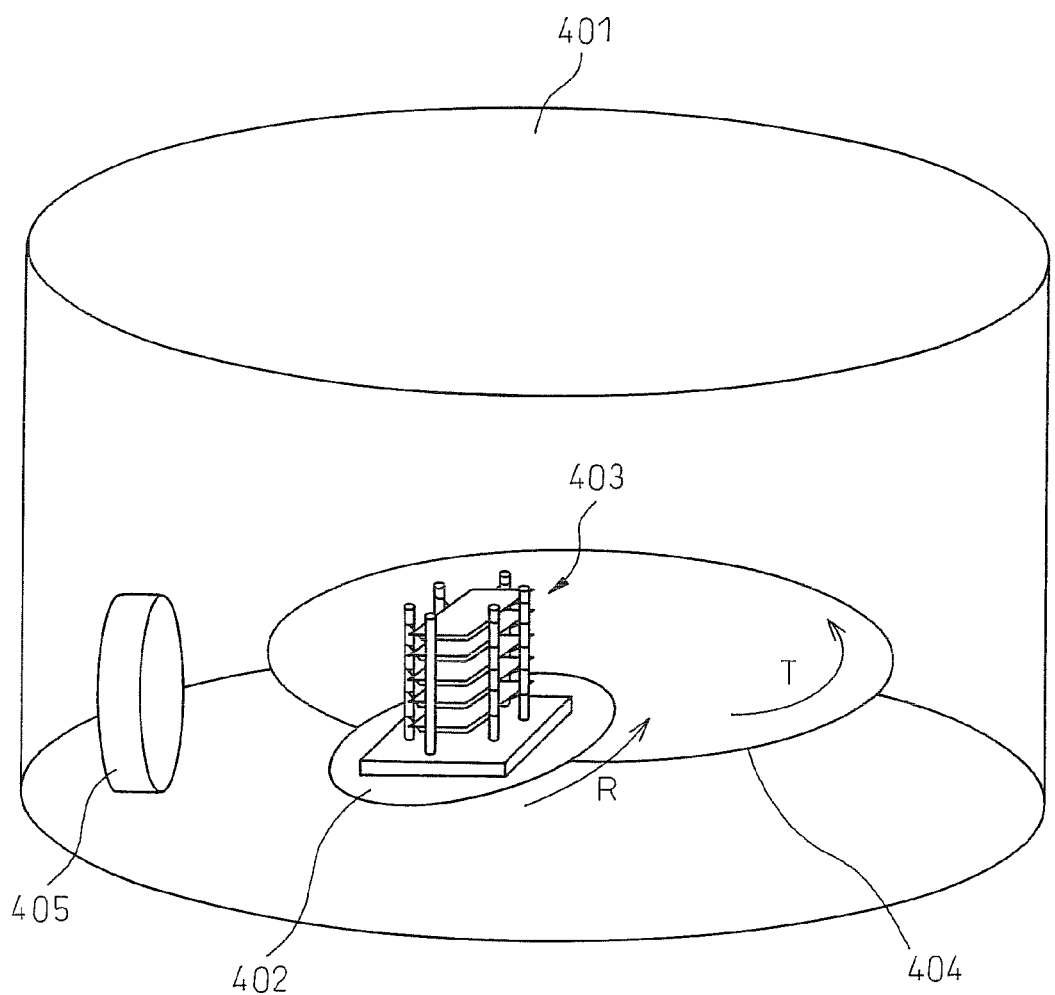
FIG. 7 is a schematic diagram showing sputtering equipment.

FIG. 7 is a schematic diagram showing sputtering equipment.

A rotary table 402 is placed inside a vacuum chamber 401, and a panel holder 403 in which liquid crystal cells are held in a horizontal position is mounted on the table 402. The table 402 rotates in an R direction, while a table supporting stage 404 on which the table 402 is placed rotates in a T direction inside the chamber 401. Further, a target 405 formed from Si is disposed so that the deposition material is sputtered in a direction lateral to the panel holder 403, and an $SiO_2$ film is deposited by sputtering in an oxygen atmosphere by bombarding the target 405 with an activated argon gas. The film can thus be deposited on the end portion of each liquid crystal panel.

Figure 8:
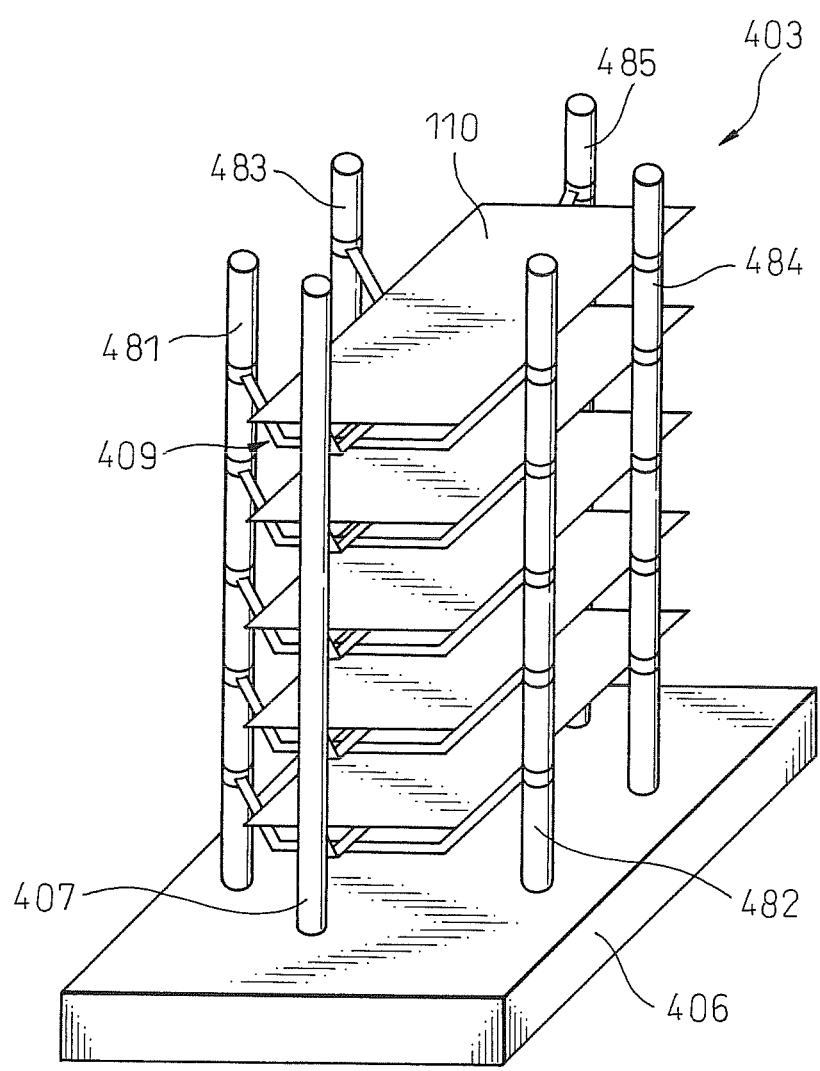
FIG. 8 is a perspective view of a panel holder 403 to be used in the sputtering equipment shown in FIG. 7.

FIG. 8 is a perspective view of the panel holder 403 to be used in the sputtering equipment shown in FIG. 7.

The panel holder 403 is constructed by arranging, on a rectangular supporting base 406, a detachable post 407 near one of the shorter sides of the liquid crystal cell 110 and five other posts, i.e., the first to fifth fixed posts 481 to 485, around the liquid crystal cell 110. The detachable post 407 can be detached when mounting the liquid crystal cell 110, as will be described later, and the first to fifth fixed posts 481 to 485 are fixed to the supporting base 406. The panel holder 403 further includes panel supporting members 409 that are fixed to the first to fifth fixed posts 481 to 485 and that match the number of liquid crystal cells 110 to be mounted. None of the panel supporting members 409 are fixed to the detachable post 407. While the present embodiment shows an example in which five liquid crystal cells 110 are mounted, the number of panel supporting members 409 need not be limited to this particular number, nor need all the panel supporting members 409 be loaded with liquid crystal cells 110.

FIG. 9 is an overhead view of the panel holder 403.

Figure 9A:
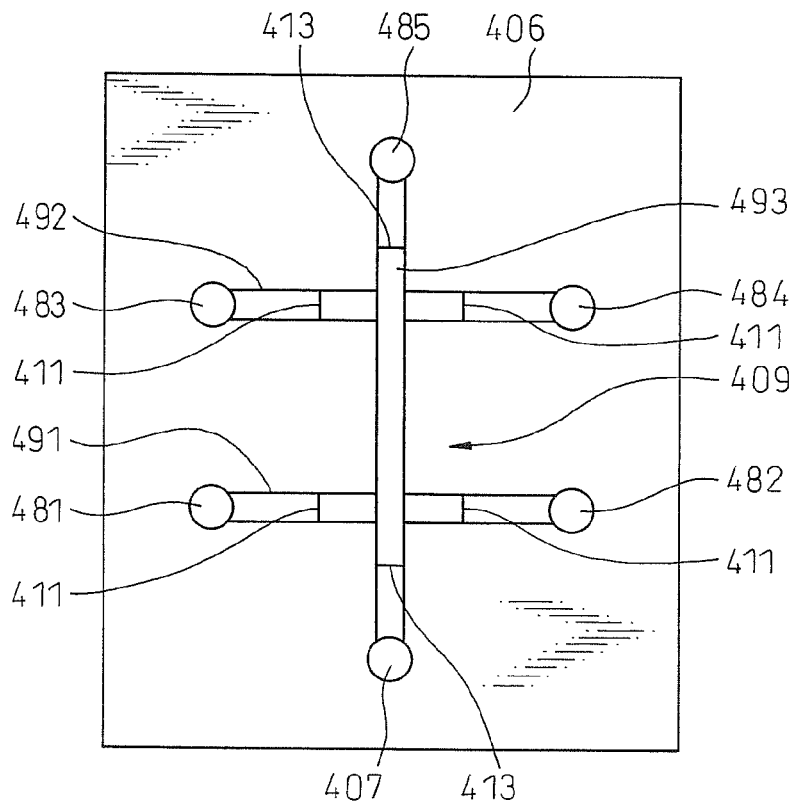
FIG. 9(a) is an overhead view showing the panel holder 403 before liquid crystal cells 110 are mounted.
Figure 9B:
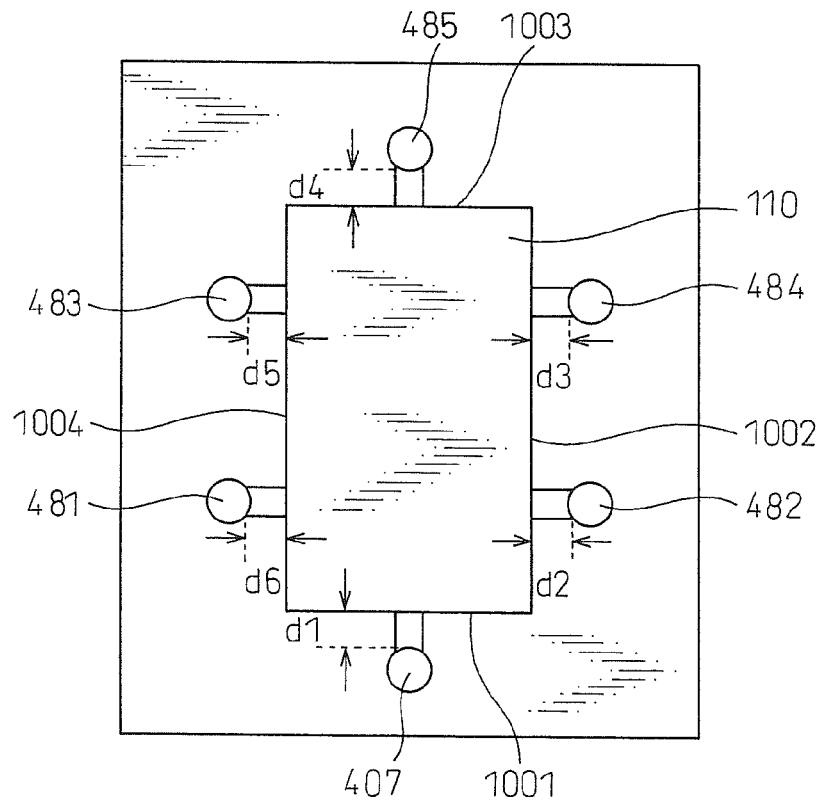
FIG. 9(b) is an overhead view showing the panel holder 403 when the liquid crystal cells 110 are mounted.

FIG. 9(a) shows the panel holder 403 before the liquid crystal cells 110 are mounted, and FIG. 9(b) shows the panel holder 403 when the liquid crystal cells 110 are mounted. As shown in FIG. 9(a), the detachable post 407 and the first to fifth fixed posts 481 to 485 are installed on the supporting base 406. A bent plate-like first panel supporting portion 491 is fixed between the first fixed post 481 and the second fixed post 482, and likewise, a bent plate-like second panel supporting portion 492 is fixed between the third fixed post 483 and the fourth fixed post 484. Further, a bent plate-like third panel supporting portion 493, one end of which is fixed to the fifth fixed post 485, is provided in such a manner as to cross the first and second panel supporting portions 491 to 492 by riding upon them. As earlier described, the third panel supporting portion 493 is not fixed to the detachable post 407. The first and second panel supporting portions 491 and 492 each have two bent portions 411, and the third panel supporting portion 493 also has two bent portions 413. The first to third panel supporting portions 491 to 493 together constitute one panel supporting member 409, and one liquid crystal panel 110 is mounted on each panel supporting member 409. While only one panel supporting member 409 is shown in FIG. 9(a), a plurality of panel supporting member 409 can be arranged in a direction perpendicular to the plane of the figure.

The distance between the two bent portions 411 of the first panel supporting portions 491 is smaller than the lateral width of the liquid crystal cell 110. Likewise, the distance between the two bent portions 411 of the second panel supporting portions 492 is also smaller than the lateral width of the liquid crystal cell 110.

FIG. 9(b) shows the condition in which the liquid crystal cell 110 is mounted on the panel holder 403. The liquid crystal cell 110 is mounted by being spaced a predetermined distance away from each post. For example, denoting the distance between the detachable post 407 and the first shorter side 1001 of the liquid crystal cell 110 by d1, and the distance between the fifth fixed post 485 and the second shorter side 1003 of the liquid crystal cell 110 by d4, it is preferable to set the distances d1 and d4 so that film is uniformly deposited on each end face of the liquid crystal cell 110. Further, it is preferable to set the distances d1 and d4 approximately equal to each other. Likewise, denoting the distance between the second fixed post 482 and the first longer side 1002 of the liquid crystal cell 110 by d2, the distance between the fourth fixed post 484 and the first longer side 1002 of the liquid crystal cell 110 by d3, the distance between the third fixed post 483 and the second longer side 1004 of the liquid crystal cell 110 by d5, and the distance between the first fixed post 481 and the second longer side 1004 of the liquid crystal cell 110 by d6, it is preferable to set the distances d2, d3, d5, and d6 so that film is uniformly deposited on each end face of the liquid crystal cell 110. Further, it is preferable to set the distances d2, d3, d5, and d6 approximately equal to each other.

Preferably, the liquid crystal cell 110 is supported at a total of four places on the first and second panel supporting portions 491 and 492. Further preferably, the liquid crystal cell 110 is also supported at at least one place on the third panel supporting portion 493 and is thus supported at a total of five or six places.

FIG. 10 is a diagram showing the panel holder 403 as viewed from the front side of FIG. 8.

Figure 10A:
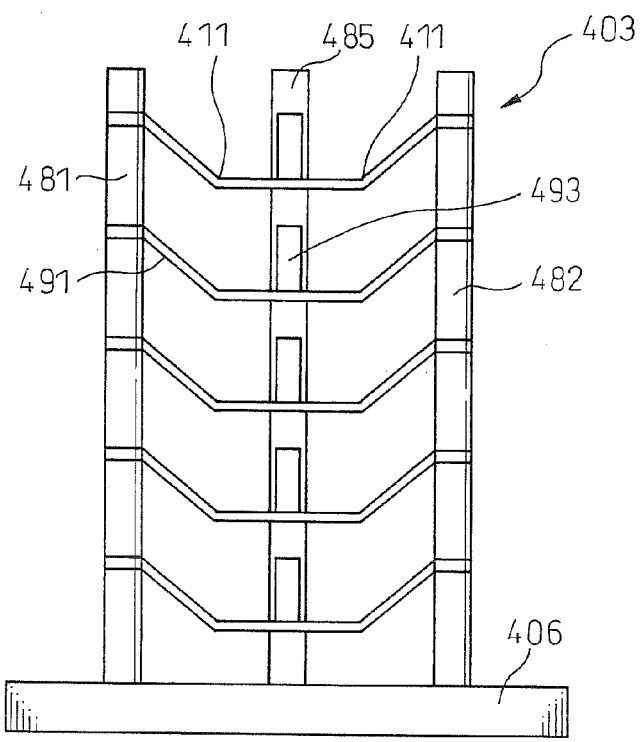
FIG. 10(a) is a front view of the panel holder 403 before the liquid crystal cells 110 are mounted.

FIG. 10(a) shows the panel holder 403 before the liquid crystal cells 110 are mounted. For illustrative purposes, the detachable post 407 is removed. The first and second fixed posts 481 and 482 are installed on the supporting base 406, and the plurality of first panel supporting portions 491 are fixed between the two posts. Though not shown here, the third and fourth fixed posts 483 and 484 are likewise installed on the supporting base 406, and the plurality of second panel supporting portions 492 are fixed between the two posts. The first panel supporting portions 491 are each bent at two places 411 and formed in a bathtub shape. The second panel supporting portions 492 not shown are also formed in like manner. The plurality of third panel supporting portions 493, each fixed at one end to the fifth fixed post 485, are provided in such a manner as to ride upon the respective first and second panel supporting portions 491 and 492; as will be described later, each third panel supporting portion 493 is also bent at two places and formed in a bathtub shape. The first panel supporting portion 491, the second panel supporting portion 492, and the third panel supporting portion 493 are combined to form one panel supporting member 409.

Figure 10B:
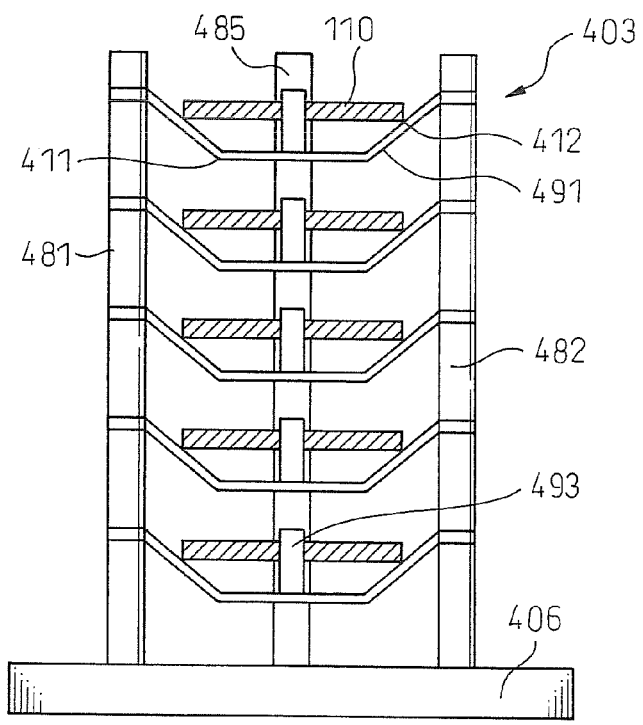
FIG. 10(b) is a front view of the panel holder 403 when the liquid crystal cells 110 are mounted.

FIG. 10(b) shows the condition in which the liquid crystal cells 110 are mounted on the respective panel supporting members 409 of the panel holder 403 shown in FIG. 10(a). Each liquid crystal cell 110 is held on one first panel supporting portion 491; in this condition, the first panel supporting portion 491 contacts only the edges 412 of the liquid crystal cell 110. Since the first panel supporting portion 491 has a plate-like shape, when the straight line sections forming the respective edges 412 of the liquid crystal cell 110 are parallel to the first panel supporting portion 491, the first panel supporting portion 491 contacts each edge 412 of the liquid crystal cell 110 only along a line. The phrase "only along a line" here refers to the condition in which the longitudinal length of the portion where the liquid crystal cell 110 contacts the panel supporting portion is very large compared with the width thereof. On the other hand, when the straight line sections forming the edges 412 of the liquid crystal cell 110 are not parallel to the first panel supporting portion 491, the first panel supporting portion 491 contacts each edge 412 of the liquid crystal cell 110 at a single point. The phrase "at a single point" here refers to the condition in which the area of the portion where the liquid crystal cell 110 contacts the panel supporting portion is very small compared with the size of the liquid crystal cell 110.

In this way, since the area of the portion where the liquid crystal cell 110 contacts the first panel supporting portion 491 is very small, and since neither the end faces nor the upper and lower surfaces of the liquid crystal cell 101 are in contact with the first panel supporting portion 491, thin films of adequate thickness can be deposited on the end faces and the upper and lower surfaces of the liquid crystal cell 110 by sputtering the deposition material in a direction lateral to the panel holder 403 while rotating the panel holder 403. Though not shown here, each edge of the liquid crystal cell 110 also contacts the second panel supporting portion 492 only along a line or at a single point.

FIG. 11 is a side view of the panel holder 403 shown in FIG. 8.

Figure 11A:
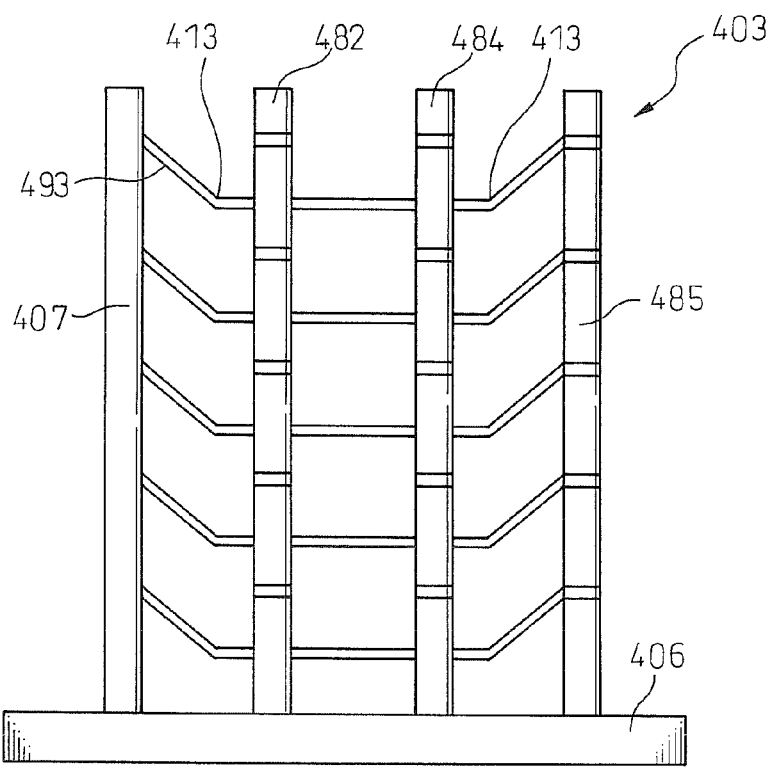
FIG. 11(a) is a side view of the panel holder 403 before the liquid crystal cells 110 are mounted.

FIG. 11(a) shows the panel holder 403 before the liquid crystal cells 110 are mounted. Unlike FIG. 10, FIG. 11 shows the condition in which the detachable post 407 is installed. The first fixed post 481 (not shown) and the second fixed post 482 are installed on the supporting base 406, and the plurality of first panel supporting portions 491 (not shown) are fixed between the two posts. Further, the third fixed post 483 (not shown) and the fourth fixed post 484 are installed on the supporting base 406, and the plurality of second panel supporting portions 492 (not shown) are fixed between the two posts. The plurality of third panel supporting portions 493, each fixed at one end to the fifth fixed post 485, are provided in such a manner as to ride upon the respective first and second panel supporting portions 491 and 492; each third panel supporting portion 493 is bent at two places 413 and formed in a bathtub shape. The first panel supporting portion 491, the second panel supporting portion 492, and the third panel supporting portion 493 are combined to form one panel supporting member 409.

Figure 11B:
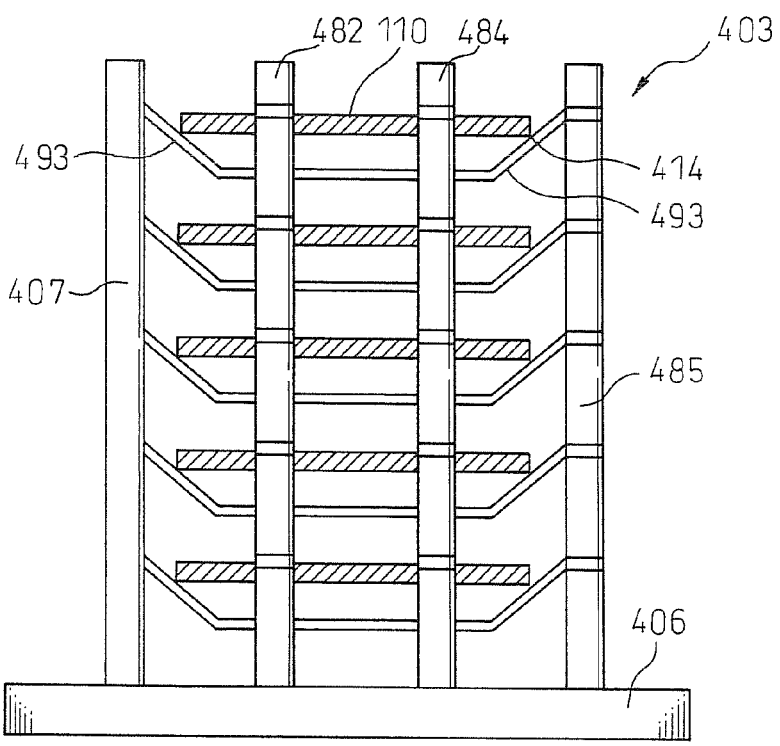
FIG. 11(b) is a side view of the panel holder 403 when the liquid crystal cells 110 are mounted.

FIG. 11(b) is a diagram showing the condition in which the liquid crystal cells 110 are mounted on the respective panel supporting members 409 of the panel holder 403 shown in FIG. 11(a). Each liquid crystal cell 110 may be mounted in such a manner as to contact the third panel supporting portion 493; in that case, the third panel supporting portion 493 contacts only the edges 414 of the liquid crystal cell 110. Since the third panel supporting portion 493 has a plate-like shape, when the straight line sections forming the edges 414 of the liquid crystal cell 110 are parallel to the third panel supporting portion 493, the third panel supporting portion 493 contacts each edge 414 of the liquid crystal cell 110 only along a line. On the other hand, when the straight line sections forming the edges 414 of the liquid crystal cell 110 are not parallel to the third panel supporting portion 493, the third panel supporting portion 493 contacts each edge 414 of the liquid crystal cell 110 at a single point. In this way, since the area of the portion where the liquid crystal cell 110 contacts the third panel supporting portion 493 is very small, and since neither the end faces nor the upper and lower surfaces of the liquid crystal cell 101 are in contact with the third panel supporting portion 493, thin films of adequate thickness can be deposited on the end faces and the upper and lower surfaces of the liquid crystal cell 110 by sputtering the deposition material in a direction lateral to the panel holder 403 while rotating the panel holder 403.

Next, a description will be given of how the liquid crystal cells 110 are mounted onto the panel holder 403.

Figure 12A:
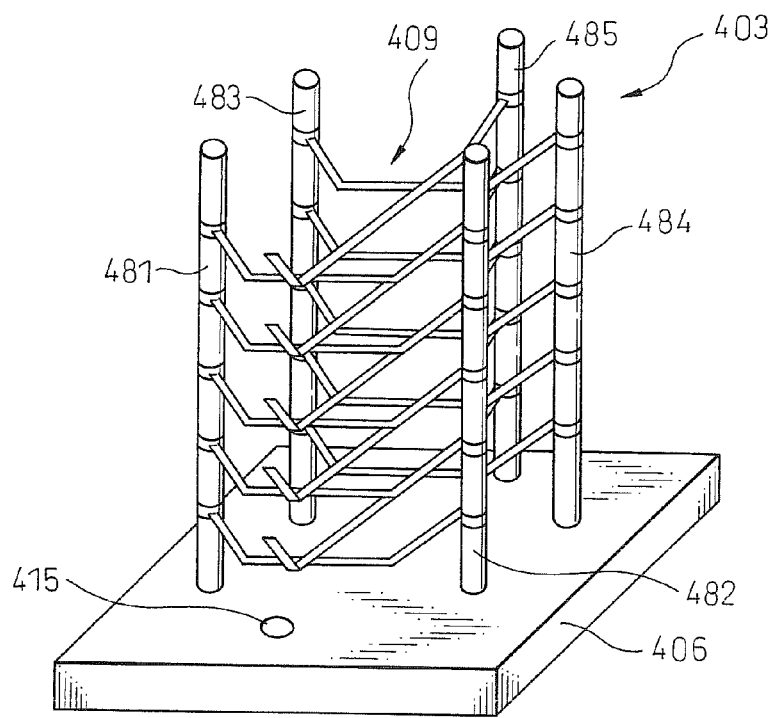
FIG. 12(a) is a diagram (part 1) illustrating how the liquid crystal cells 110 are mounted onto the panel holder 403.
Figure 12B:
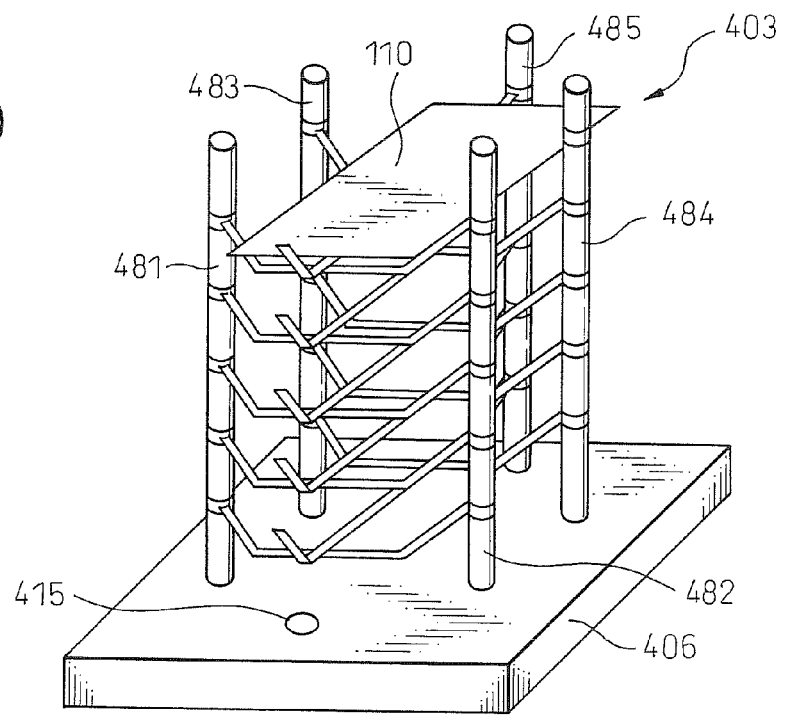
FIG. 12(b) is a diagram (part 2) illustrating how the liquid crystal cells 110 are mounted onto the panel holder 403.
Figure 13A:
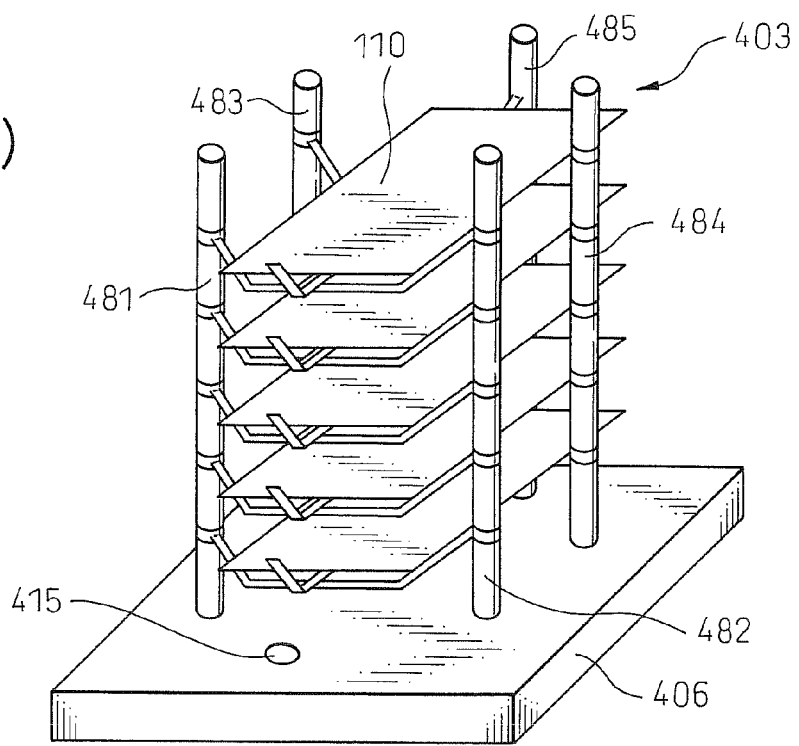
FIG. 13(a) is a diagram (part 3) illustrating how the liquid crystal cells 110 are mounted onto the panel holder 403.
Figure 13B:
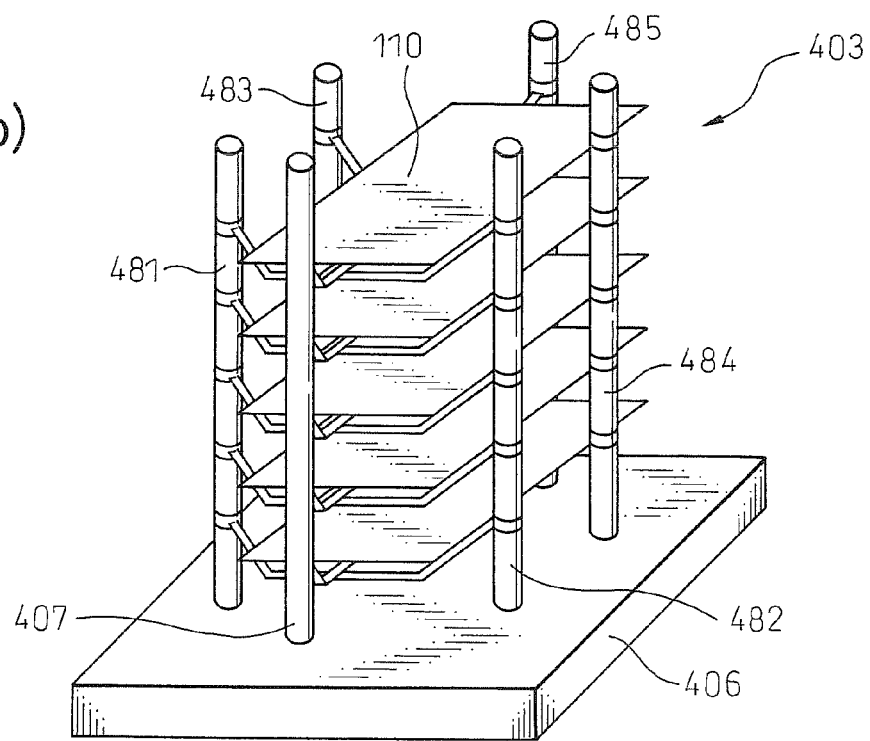
FIG. 13(b) is a diagram (part 4) illustrating how the liquid crystal cells 110 are mounted onto the panel holder 403.

First, as shown in FIG. 12(a), the detachable post is removed from a connecting portion 415 formed in the supporting base 406 of the panel holder 403. Next, the liquid crystal cells 110 are mounted onto the respective panel supporting members 409. FIG. 12(b) is a diagram showing the condition in which one liquid crystal cell 110 is mounted on the uppermost panel supporting member 409. The second and subsequent liquid crystal cells 110 are mounted onto the panel supporting members 409 in the same manner; FIG. 13(a) shows the condition in which all the liquid crystal cells 110 are mounted on the respective panel supporting members 409. Finally, the detachable post 407 is installed into the connecting portion 415 of the supporting base 406. The detachable post 407 thus installed serves to prevent the liquid crystal cells 110 from working out of the supporting members during the film deposition process; the provision of the detachable post 407 facilitates the mounting of the liquid crystal cells 110 on the panel holder 403.

The panel holder 403 is advantageously formed, for example, from stainless steel. However, other material may be chosen for use, provided that the material has the required rigidity and does not generate gases or particles.

The first to third panel supporting portions 491 to 493 have been described above as being formed from straight line sections having bent portions, but they may be formed in a curved shape.

Figure 14:
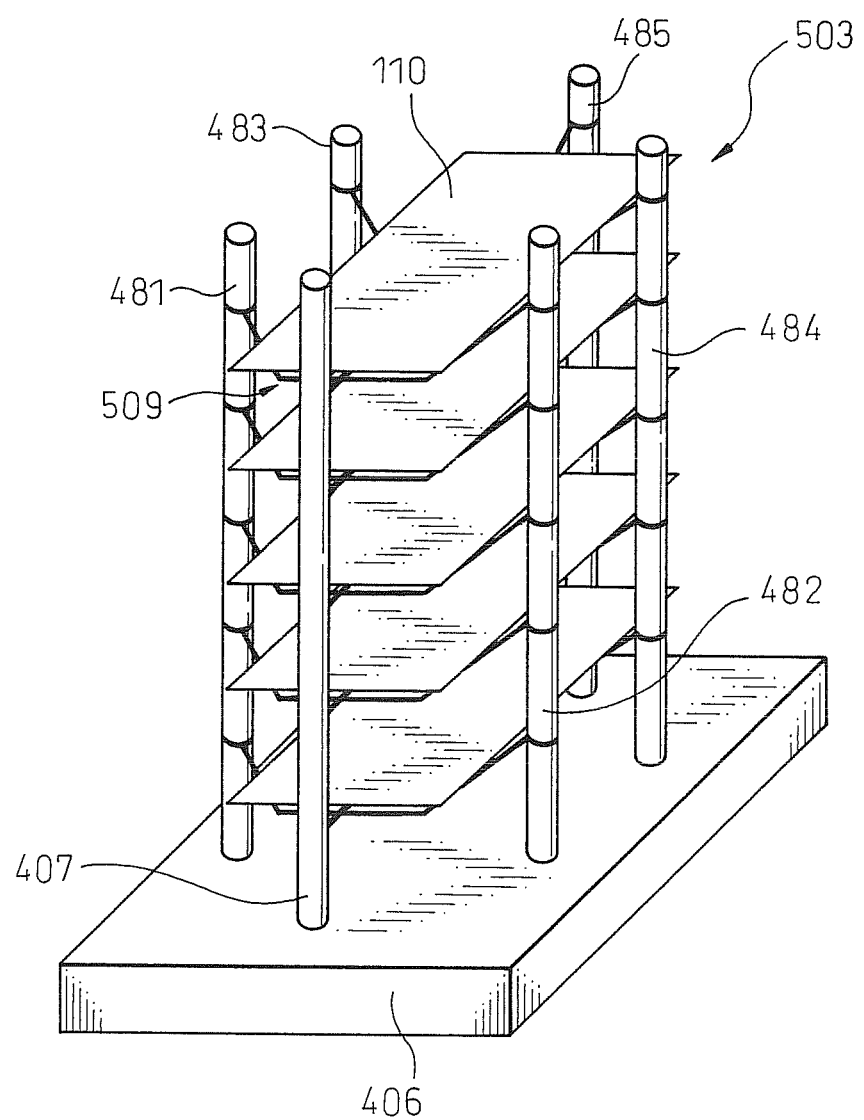
FIG. 14 is a perspective view of an alternative panel holder 503 to be used in the sputtering equipment shown in FIG. 7.

FIG. 14 is a perspective view of an alternative panel holder 503 to be used in the sputtering equipment shown in FIG. 7.

The panel holder 503 differs from the above-described panel holder 403 in that the panel supporting members are formed from fine lines. The term "fine lines" here refers to the structure whose cross section is very small compared with its longitudinal length. These panel supporting members can be formed, for example, from wires or the like.

Since each panel supporting member 509 of the panel holder 503 is formed from fine lines, the panel supporting member 509 contacts the respective edges of the liquid crystal cell 110 at single points. The phrase "at single points" here refers to the condition in which the area of each portion where the liquid crystal cell 110 contacts the panel supporting member 509 is very small compared with the size of the liquid crystal cell 110. In this way, since the area of each portion where the liquid crystal cell 110 contacts the panel supporting member 509 is very small, and since neither the end faces nor the upper and lower surfaces of the liquid crystal cell 101 are in contact with the panel supporting member 509, thin films of adequate thickness can be deposited on the end faces and the upper and lower surfaces of the liquid crystal cell 110 by sputtering the deposition material in a direction lateral to the panel holder 503 while rotating the panel holder 503. Other than the above difference, the structure of the panel holder 503 is identical to that of the panel holder 403, and therefore, will not be further described here.

In the above embodiment, the first to third panel supporting portions 491 to 493 have been described as being formed from straight line sections having bent portions, but they may be formed in a curved shape, provided that they contact the liquid crystal cell 110 at single points.

The panel holder 503 is advantageously formed, for example, from stainless steel. However, other material may be chosen for use, provided that the material has the required rigidity and does not generate gases or particles.

What is claimed is:

1. A liquid crystal panel comprising:
   a liquid crystal cell which includes a first substrate, a second substrate, a sealing member, and a liquid crystal layer provided between said first and second transparent substrates and sealed by said sealing member;
   a planarizing layer formed so as to cover a side surface of at least end portions of said first and second substrates of said liquid crystal cell;
   an inorganic gas barrier layer, which is deposited as a film on said planarizing layer so as to cover a side surface of each end portion of said first and second substrates, thereby preventing infiltration of gas from said end portions of said first and second substrates; and an organic protective layer formed on said inorganic gas barrier layer.

2. The liquid crystal panel according to claim 1, wherein said planarizing layer is formed so as to further cover designated portions of upper and lower surfaces of said liquid crystal cell.

3. The liquid crystal panel according to claim 1, wherein said first and second transparent substrates are plastic substrates.

4. The liquid crystal panel according to claim 1, further comprising another gas barrier layer formed on each of said first and second transparent substrates.

5. A liquid crystal panel comprising:
   a liquid crystal cell which includes a first substrate, a second substrate, a sealing member, and a liquid crystal layer provided between said first and second transparent substrates and sealed by said sealing member;
   a planarizing layer formed so as to cover a side surface of at least end portions of said first and second substrates of said liquid crystal cell; and
   a gas barrier layer deposited on said planarizing layer,
   wherein said gas barrier layer includes an inorganic gas barrier layer deposited as a film on said planarizing layer and an organic protective layer formed on said inorganic gas barrier layer, so as to prevent infiltration of gas from said end portions of said first and second substrates.

* * * * *